US006418253B2

(12) United States Patent
Whitehead

(10) Patent No.: US 6,418,253 B2
(45) Date of Patent: Jul. 9, 2002

(54) HIGH EFFICIENCY REFLECTOR FOR DIRECTING COLLIMATED LIGHT INTO LIGHT GUIDES

(75) Inventor: Lorne A. Whitehead, Vancouver (CA)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 0 days.

(21) Appl. No.: 09/865,430

(22) Filed: May 29, 2001

Related U.S. Application Data

(63) Continuation-in-part of application No. 09/264,247, filed on Mar. 8, 1999, now abandoned.

(51) Int. Cl.⁷ .................................................. G02B 6/26
(52) U.S. Cl. ........................... 385/31; 385/32; 362/300; 362/301; 362/302
(58) Field of Search ............................... 385/31, 32, 33; 362/511, 512, 515, 300, 312, 301, 303, 551, 581, 255, 302, 343

(56) References Cited

U.S. PATENT DOCUMENTS

| | | | |
|---|---|---|---|
| 2,179,161 A | 11/1939 | Rambusch et al. | |
| 4,241,382 A | 12/1980 | Daniel | |
| 4,615,579 A | 10/1986 | Whitehead | |
| 4,750,798 A | 6/1988 | Whitehead | |
| 4,755,918 A | 7/1988 | Pristash et al. | |
| 4,787,708 A | 11/1988 | Whitehead | |
| 4,834,495 A | 5/1989 | Whitehead | |
| 4,850,665 A | 7/1989 | Whitehead | |

FOREIGN PATENT DOCUMENTS

| | | |
|---|---|---|
| JP | 63 092909 A | 9/1988 |
| WO | WO 00/53972 | 9/2000 |

OTHER PUBLICATIONS

The Photonics Dictionary, 45th ed., 1999, Laurin Publ. Co. Inc., Pittsfield, MA, p. D–26, definition of "collimated radiation".

Primary Examiner—Mohammad Sikder
(74) Attorney, Agent, or Firm—Oyen Wiggs Green & Mutala

(57) ABSTRACT

A reflector for reflecting light from an elongate light source into the input end of a light guide having a diameter "D". The light source is inserted through the narrow end of a collimating reflector which has a wide end with a diameter exceeding "D" through which light is emitted into the guide. The wide end of an output reflector circumferentially surrounds the collimating reflector's wide end. The output reflector's narrow end circumferentially surrounds the light guide's input end. The wide end of an input reflector circumferentially surrounds the collimating reflector's narrow end. The reflectors are cylindrically symmetrical about a common axis. Light passing from the light source to the collimating reflector is reflected, producing an output beam whose width varies as a function of distance along the axis. The light guide's input end is positioned along the axis to minimize the width of the output light beam.

6 Claims, 8 Drawing Sheets

HIGH EFFICIENCY REFLECTOR FOR DIRECTING COLLIMATED LIGHT INTO LIGHT GUIDES

REFERENCE TO RELATED APPLICATION

This is a continuation-in-part of U.S. patent application Ser. No. 09/264,247 filed Mar. 8, 1999, now abandoned.

TECHNICAL FIELD

This invention pertains to efficient reflective coupling of collimated light into the input end of a light guide.

BACKGROUND

FIG. 1 schematically depicts the way in which light is conventionally emitted into the input end of a light guide of the type disclosed in, U.S. Pat. Nos. 4,615,579; 4,750,798; 4,787,708; 4,834,495; or, 4,850,665. An elongate (i.e. non-point) light source such as an arc-type metal halide light bulb 10 mounted in a socket 12 is slidably inserted through an aperture 14 in a paraboloidal collimator 16. The circumferential rim at the wide end of collimator 16 is flanged as shown at 18. A mating circumferential flange 20 is provided around the input end of hollow prism light guide 22. Flanges 18, 20 are connected together to mechanically couple collimator 16 to the input end of light guide 22. When light bulb 10 is energized, light rays emitted by the bulb's arc portion 24 are reflected and collimated by collimator 16 toward the input end of light guide 22 which confines the rays and distributes them uniformly along the light guide.

Prism light guides work best when the input light is collimated within a half angle of about 30°. This requirement limits the range of suitable light sources, because the efficiency with which light can be emitted into the input end of the light guide decreases rapidly as the size of the light bulb increases. Arc-type metal halide light bulbs of the type shown in FIG. 1 are reasonably practical light sources for illuminating light guides, due to their high efficiency, compact size and reasonably long lamp life.

The maximum efficiency with which prior art paraboloidal collimator 16 can couple collimated light into light guide 22 depends on the ratio of the light guide's diameter "D", to the length "L" of the light bulb's arc. For a typical prior art D:L ratio of about 6:1, reflector efficiencies of about 70% can be achieved. Thus, about 30% of the light emitted by light bulb 10 is typically lost, in the sense that it does not enter the input end of light guide 22. It is desirable to reduce the ratio D:L, since this would enable the use of larger, higher output, more efficient metal halide arc lamps. But, even modest reductions in the ratio D:L substantially reduce the efficiency with which light emitted by the light bulb can be collimated and coupled into the input end of the light guide. For example, a D:L ratio of about 4:1 typically yields a light guide input coupling efficiency of only about 50%, meaning that about 50% of the light emitted by the light bulb is lost, in the sense that it does not enter the input end of the light guide as collimated light.

This invention overcomes the coupling efficiency problems associated with conventional light guide systems. For example, the invention permits efficient collimation and coupling of light emitted by a one kW metal halide light bulb having a 12,000 hour rated life into a 25 cm diameter light guide. Such systems are advantageous in general lighting situations in which high efficiency linear lighting is required and in which maintenance of multiple point source or fluorescent fixtures is problematic.

SUMMARY OF INVENTION

The invention provides a reflector for reflecting light emitted by an elongate light source into the input end of a light guide having a light guide diameter "D". All embodiments of the invention incorporate a collimating reflector having a narrow apertured end through which the light source is insertably positionable; and, a wide apertured end having a diameter exceeding "D", through which light is emitted into the light guide. All embodiments of the invention also incorporate an "output end" annular reflector, or an "input end annular reflector, or both.

The output end annular reflector has a wide apertured end which circumferentially surrounds the collimating reflector near its wide apertured end, and a narrow apertured end which circumferentially surrounds the input end of the light guide. The input end annular reflector has a narrow apertured end through which the light source is insertably positionable, and a wide apertured end which circumferentially surrounds the collimating reflector near its narrow apertured end. All of the reflectors are cylindrically symmetrical about a common longitudinal axis. Light rays emitted by the light source which pass to the collimating reflector are reflected by the collimating reflector and produce an output light beam having a beam width which varies as a function of distance along the aforementioned axis. The light guide's input end is positioned at a selected distance along the axis at which the output light beam has a minimum beam width value.

Advantageously, the input end annular reflector further has a curved surface, such that, in any cross-sectional plane containing the aforementioned axis, the curved surface defines a first arc on one side of the axis, and, a second arc on an opposed side of the axis. The first arc has a first centre of curvature located on the one side of the axis, and further located within a cylinder which is symmetrical about the axis and which has a diameter not greater than the diameter of the collimating reflector's narrow apertured end. The second arc has a second centre of curvature located on the opposed side of the axis and further located within the aforementioned cylinder.

The collimating reflector is preferably an off-axis paraboloidal cross-section, cylindrically symmetrical reflector having a focal point f. The output end annular reflector preferably forms a spherical arc section having a center of curvature near the collimating reflector's focal point f. The light source is typically a metal halide light bulb having a light emitting arc having one end near the focal point f and an opposed end near the narrow apertured end of the collimating reflector.

DESCRIPTION

Figure 3:
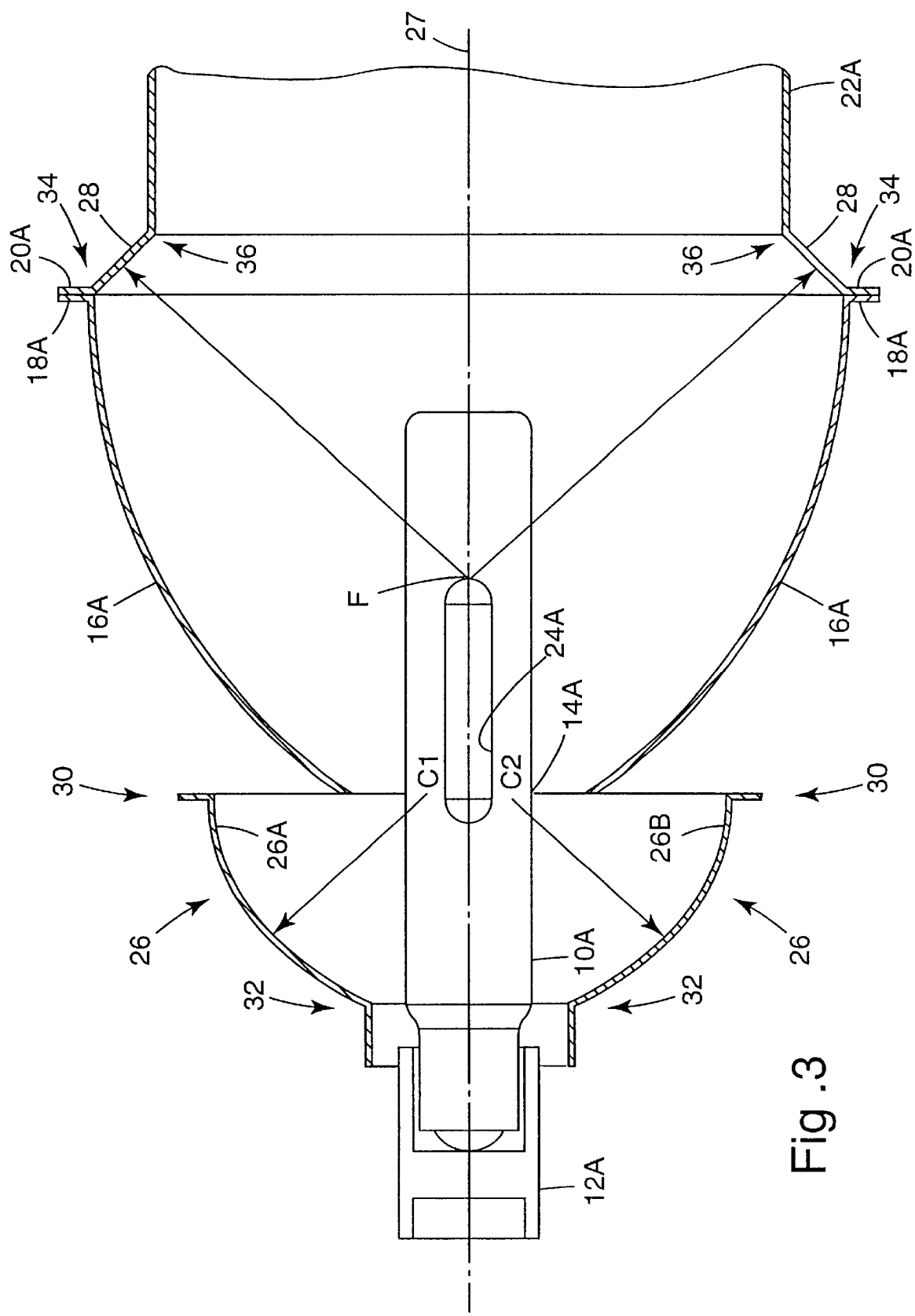
FIG. 3 is a schematic side elevation view of a reflector constructed in accordance with the invention.
Figure 4:
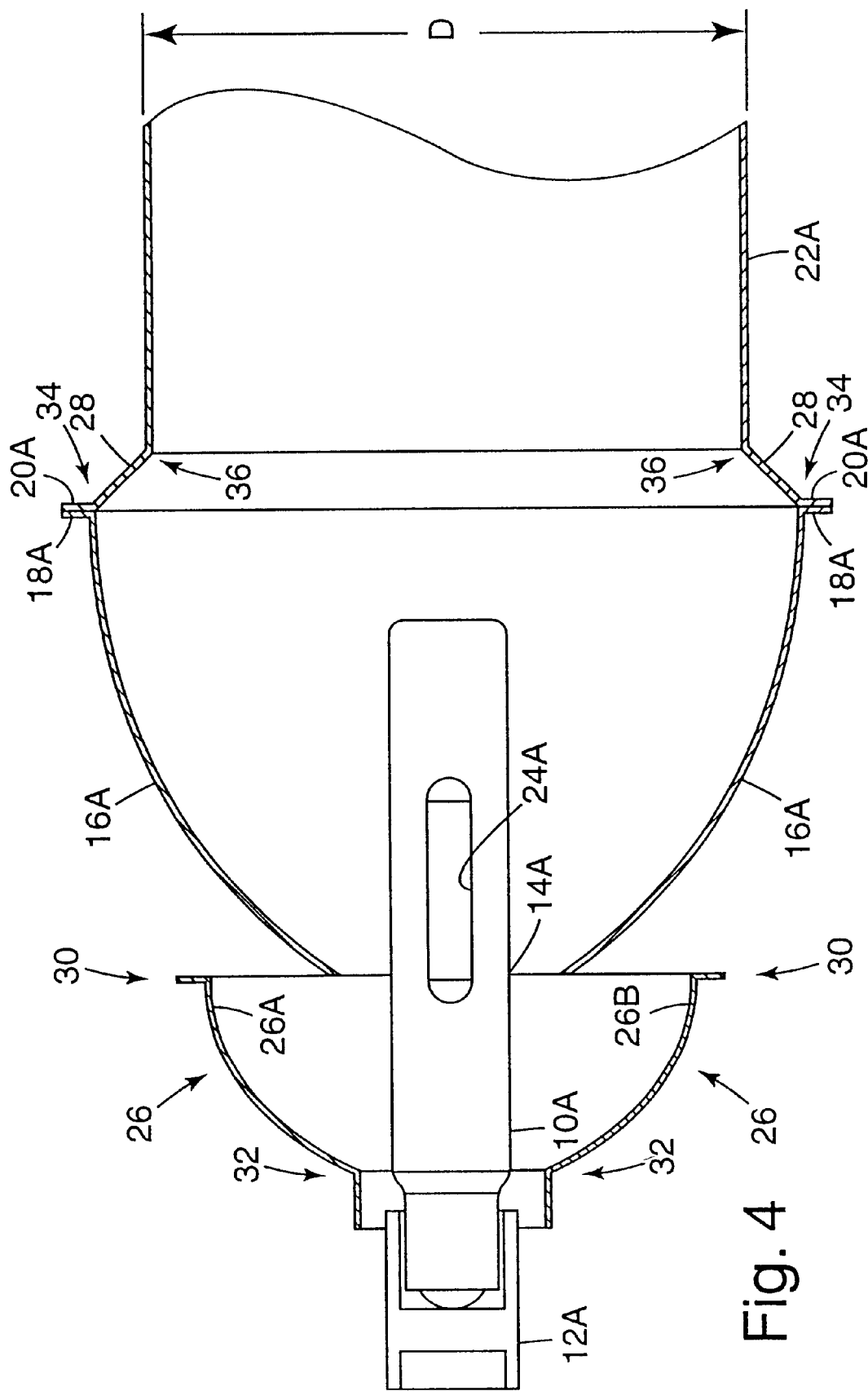
FIG. 4 is similar to FIG. 3, but shows a longer portion of the light guide.

As shown in FIGS. 3 and 4, reflectors constructed in accordance with the invention include a collimating reflector such as conventional paraboloidal collimator 16A, which is preferably an off-axis paraboloidal cross-section cylindrically symmetric reflector. Arc-type metal halide light bulb 10A mounted in socket 12A is slidably inserted through aperture 14A in the narrow end of paraboloidal collimator 16A, as in the case of prior art reflector 16 described above. Unlike prior art reflectors, reflectors constructed in accordance with the invention include not only paraboloidal collimator 16A, but also annular reflectors 26 and 28.

Figure 1:
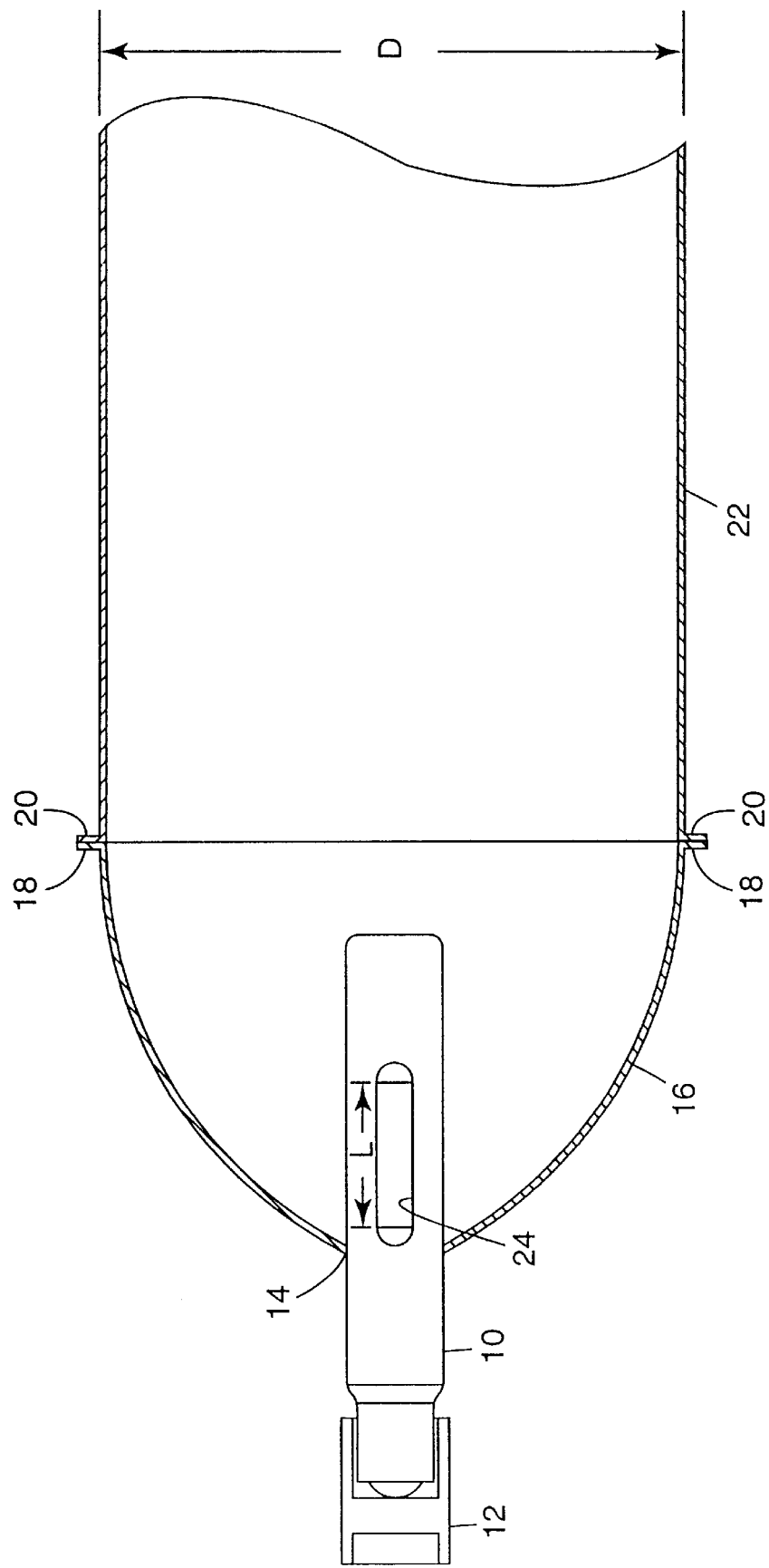
FIG. 1 is a schematic side elevation view of a prior art paraboloidal collimator mounted to reflect light emitted by an arc-type metal halide light bulb into the input end of a light guide.

As seen in FIG. 1, the diameter of prior art paraboloidal collimator 16 at its wide end (i.e. the end bearing circumferential flange 18) is substantially equal to the diameter D of light guide 22. However, the wide end diameter of paraboloidal collimator 16A shown in FIGS. 3 and 4 exceeds the diameter D of light guide 22A. This facilitates collimation of light emitted by a metal halide light bulb 10A which is larger than light bulb 10, assuming light guides 22, 22A to be of equal diameter.

Figure 2:
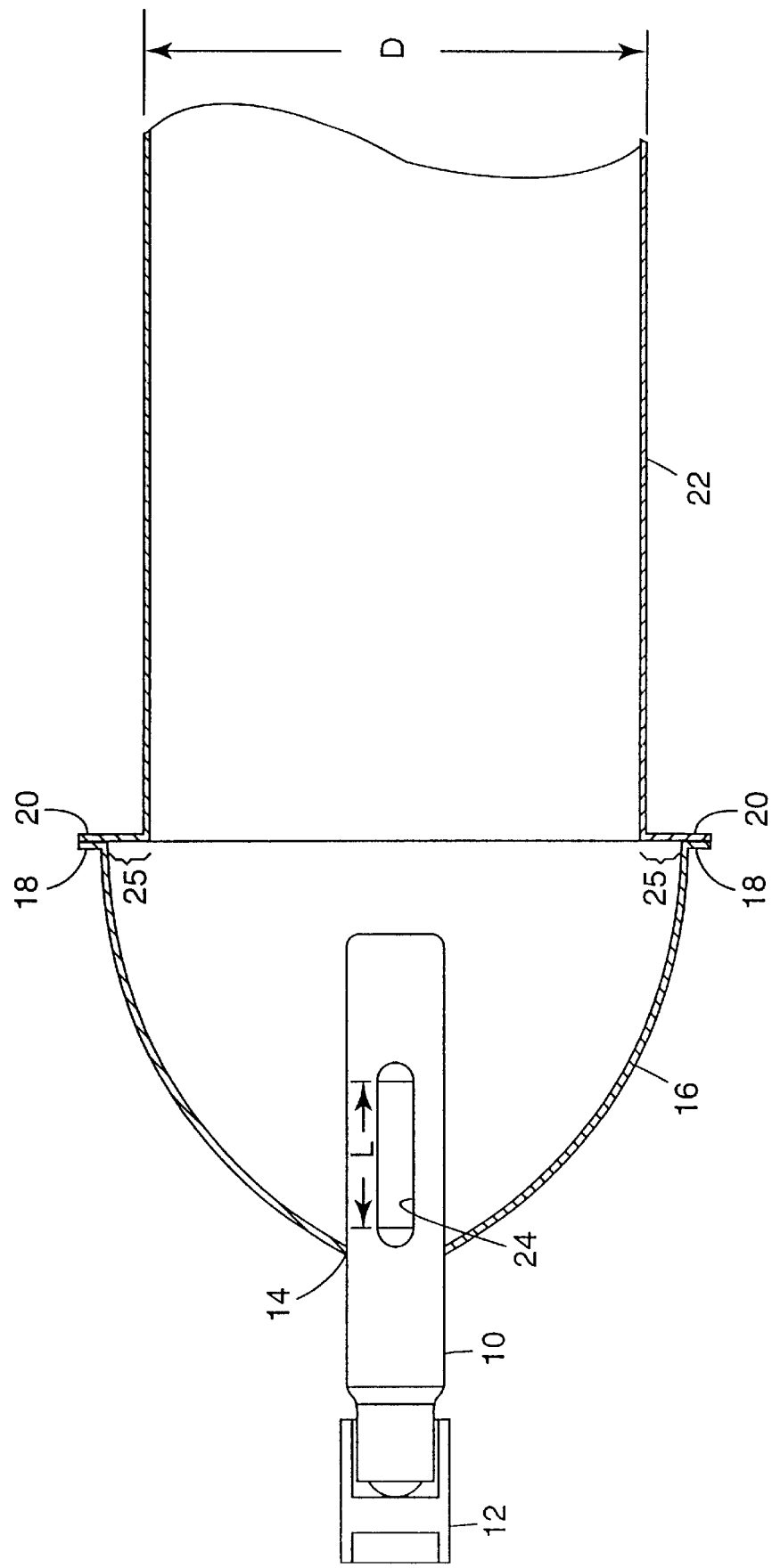
FIG. 2 is similar to FIG. 1, except that the light guide diameter "D" is less than the diameter of the outward end of the paraboloidal collimator.

If a larger light bulb were used in a prior art reflector system like that of FIG. 1, the diameter of aperture 14 in the narrow end of paraboloidal collimator 16 would have to be increased to facilitate insertion of the larger bulb. Increasing the diameter of aperture 14 increases the amount of light which is lost due to rearward emission (i.e. to the left, as viewed in the drawings) outside paraboloidal collimator 16 and away from light guide 22. This problem is solved by the provision of annular reflector 26, as hereinafter explained. Increasing the wide end diameter of the paraboloidal collimator would also cause a problem in a prior art reflector system. Specifically, light rays which encounter the annular region of overlap 25 (FIG. 2) between paraboloidal collimator 16 and light guide 22 are lost, in that they do not enter the input end of light guide 22. This problem is solved by the provision of another annular reflector 28, as hereinafter explained.

"Input end" annular reflector 26 is an aspherical arc section reflector having a wide apertured end 30 (FIG. 3) which circumferentially surrounds paraboloidal collimator 16A, near the narrow apertured (i.e. "input") end of paraboloidal collimator 16A. (Reflector 26 is "annular" in the sense that it forms a ring around axis 27 when viewed from the right along axis 27.) Light bulb 10A is slidably inserted through the narrow apertured end 32 of annular reflector 26. Annular reflector 26 intercepts much of the light which is emitted rearwardly (i.e. to the left, as viewed in the drawings) by light bulb arc 24A and reflects a substantial portion of such rearwardly emitted light back through aperture 14A and light bulb 10A for further reflection by paraboloidal collimator 16A into light guide 22A.

The aspherical characteristic of reflector 26 (i.e. the shape of reflector 26 deviates slightly from a perfectly spherical shape) ensures that most light rays reflected by reflector 26 are unlikely to pass through arc 24A, thus avoiding reabsorption of such rays by arc 24A. More particularly, reflector 26 is preferably toroidal in the sense that, when viewed in cross-section as shown in FIGS. 3 and 4, curved portions 26A and 26B of reflector 26 form circular arcs having centres which lie slightly off the longitudinal axis 27 about which paraboloidal collimator 16A, light guide 22A, reflectors 26, 28 and light bulb 10A are respectively cylindrically symmetrical. Thus, the circular arc formed by curved reflector portion 26A has a center C1 which is located above axis 27, within the diameter of aperture 14A at the narrow (i.e. "input") end of paraboloidal collimator 16A. Similarly, the center C2 of the circular arc formed by curved reflector portion 26B is beneath axis 27, within the diameter of aperture 14A. Centers C1, C2 need not lie on lines which are diameters of aperture 14A, although such positioning is preferred, as shown in FIG. 3. Generally, it is sufficient to locate centers C1, C2 within a cylinder which is symmetric about axis 27 and which has a diameter equal to the diameter of aperture 14A. The inner reflecting surface of reflector 26 is preferably slightly diffuse (i.e. non-specular) to further reduce possible reabsorption by arc 24A of light rays reflected by reflector 26.

As shown in FIG. 3, the end of arc 24A closest to the wide end of paraboloidal collimator 16A is positioned to coincide with, or at least be located near to the focal point f of paraboloidal collimator 16A. Light rays emitted by arc 24A near focal point f which reach paraboloidal collimator 16A are reflected by paraboloidal collimator 16A through a range of angles toward the input end of light guide 22A. If the input end of light guide 22A were moved away from the output end of paraboloidal collimator 16A (i.e. moved to the right, as viewed in the drawings) then more of the light rays reflected by paraboloidal collimator 16A could be coupled into the input end of light guide 22A. However, this would again leave an annular region or gap through which light rays passing directly from arc 24A would be lost. Annular reflector 28 solves this problem as well as the aforementioned problem respecting loss of light rays at annular region 25.

"Output end" annular reflector 28 is a spherical arc section reflector having a center coinciding with focal point f. More particularly, reflector 28 has a wide apertured end 34 (FIG. 4) which circumferentially surrounds paraboloidal collimator 16A near the wide apertured (i.e. "output") end of paraboloidal collimator 16A. Reflector 28 also has a narrow apertured end 36 which circumferentially surrounds the input end of light guide 22A. (Reflector 28 is "annular" in the sense that it forms a ring around axis 27 when viewed from the left along axis 27.) Light rays which would otherwise be lost through annular region 25 as aforesaid are reflected by reflector 28 for possible re-reflection by paraboloidal collimator 16A into light guide 22A. The efficiency with which reflector 28 reflects light is not particularly high due to a number of factors. In particular, some rays may be lost due to absorption by reflector 28 itself (collimator 16A and reflector 26 are also absorptive to some degree); some rays may be lost due to reflection onto and reabsorption by arc 24A; some rays may be lost due to reflection through aperture 14A; and, in general, efficiency is reduced whenever multiple reflections occur, such as reflection by reflector 28 followed by further reflection by paraboloidal collimator 16A. However, only a relatively small portion of the light rays emitted by arc 24A reach reflector 28, so losses inherent in its comparative reduced efficiency are acceptable. The inner reflecting surface of reflector 28 may be made slightly diffuse (i.e. non-specular) to further reduce possible reabsorption by arc 24A of light rays reflected by reflector 28, although this is not essential.

Figure 5:
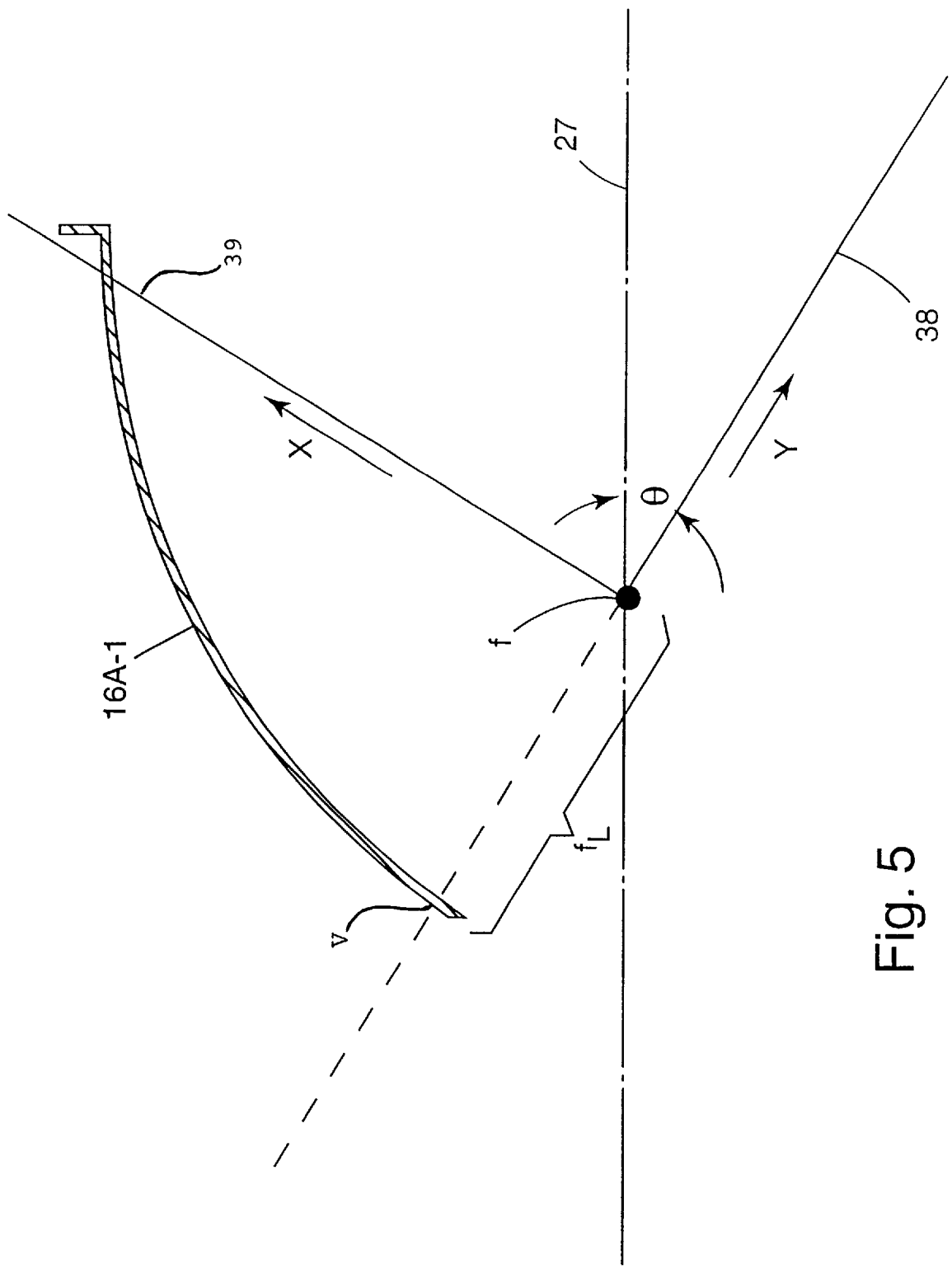
FIG. 5 is a schematic fragmented cross-section showing the geometric characteristics of the preferred off-axis paraboloidal collimator.
Figure 6:
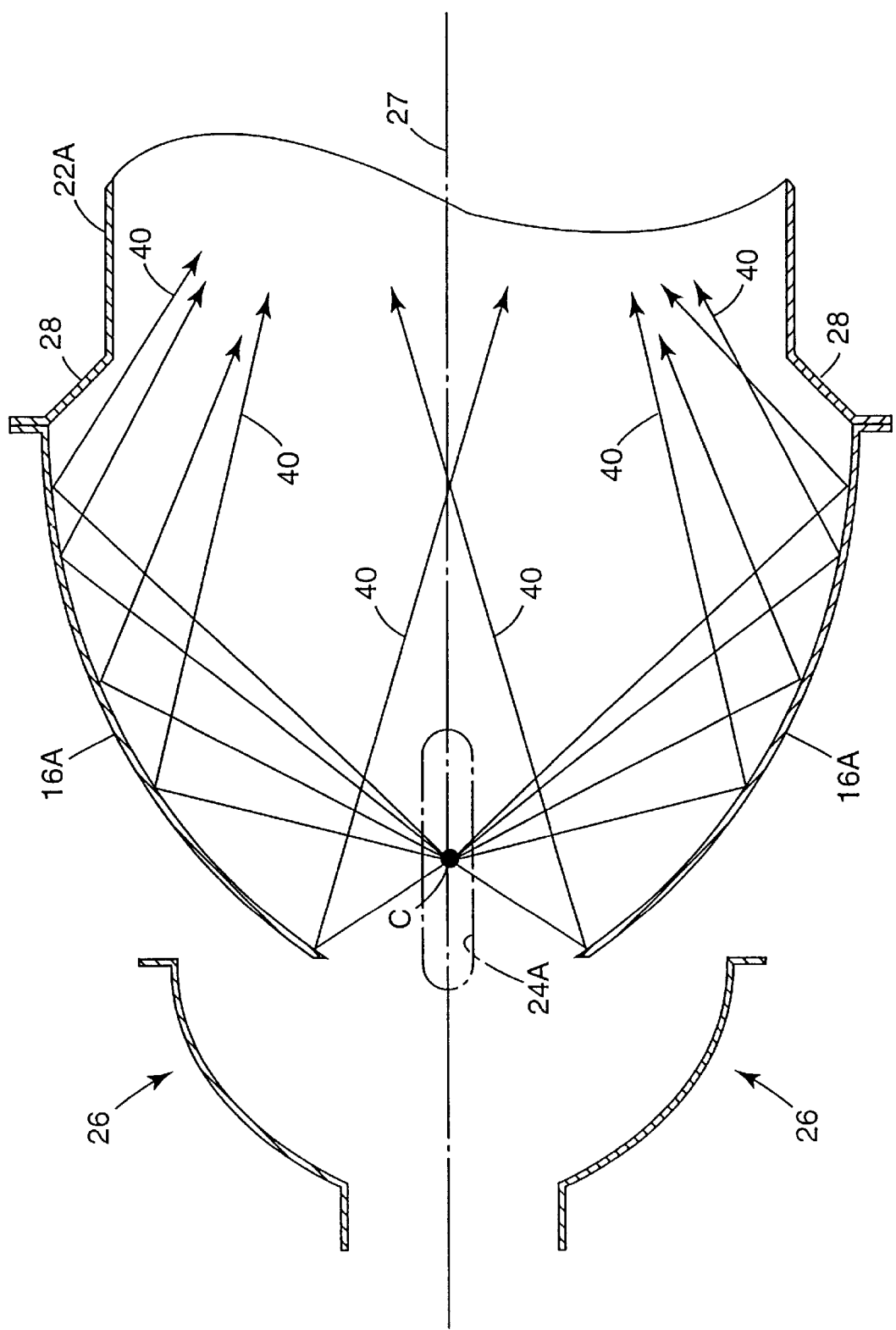
FIG. 6 is a schematic side elevation view of a reflector constructed in accordance with the invention, showing how the paraboloidal collimator reflects into the light guide substantially all light rays which pass directly from the center "C" of the light source to the paraboloidal collimator.

FIG. 5 illustrates the preferred geometric characteristics of off-axis paraboloidal collimator 16A. As shown in FIG. 6, these characteristics enable collimator 16A to direct into the input end of light guide 22A, as collimated light, substantially all light rays which pass directly from arc 24A to paraboloidal collimator 16A. Persons skilled in the art conventionally use the term "collimated", as does this application, to describe a light beam containing light rays which trace paths defining a limited range of directions, as opposed to a non-collimated light beam containing rays which trace paths in all directions. Thus, persons skilled in the art will understand that paraboloidal collimator 16A is a "collimating" reflector and that light rays 40 depicted in FIG. 6 are "collimated", even though rays 40 do not represent theoretically perfect collimation. "Perfect" collimation in which light rays propagate in parallel relationship without any crossing or intersection of the rays' paths, can never be attained in practice, as is well known to persons skilled in the art. See for example *The Photonics Dictionary*, 45th ed., 1999, Laurin Publ. Co. Inc., Pittsfield, Mass. which defines collimated radiation as follows "Radiation in which every ray from any given object point can be considered to be parallel to every other. This is never completely the case: The light from a star is really diverging, and all collimators have aberrations."

Paraboloidal collimator 16A consists of two parabolic sections located on opposite sides of axis 27 (i.e. the upper and lower sides of axis 27, as viewed in the drawings). The upper parabolic section is formed by rotating a parabola 16A-1 through a 180° arc about and above axis 27, as viewed in FIG. 5. Parabola 16A-1 is an "off-axis" parabola, in that its vertex V is located above, not on, axis 27. The axis 38 of parabola 16A-1 intersects axis 27 at an angle Θ, with the parabola's focus f being at the point of intersection of axes 27, 38. The focal length $f_L$ of parabola 16A-1 is the segment of axis 38 extending between the parabola's vertex V and focus f. In an embodiment of the invention in which collimated light is coupled into the input end of a light guide having a diameter of 25 cm, parabola 16A-1 is defined by the equation:

$$y = \frac{x^2}{4f} - f$$

where y is measured along axis 38 as shown in FIG. 5; x is measured along the perpendicular axis 39 passing through the parabola's focus f; Θ=33.2°; and, f=8.862 cm. The lower parabolic section of paraboloidal collimator 16A is identical to the upper parabolic section, except that it is formed by rotating another off-axis parabola through a 180° arc about and below axis 27, as viewed in FIG. 5.

As shown in FIG. 6, the above-described off-axis, cylindrically symmetric characteristics of paraboloidal collimator 16A ensure that substantially all of the light rays 40 which pass directly from light bulb arc 24A (more particularly, all light rays originating or passing through the centre "C" of light bulb arc 24A) to paraboloidal collimator 16A are reflected into the input end of light guide 22A. Accordingly, rays which would otherwise be lost in annular region 25 (FIG. 2) if a prior art, non off-axis paraboloidal reflector 16 having an output diameter greater than the light guide's input diameter were used, are collimated and directed into the input end of light guide 22A by off-axis paraboloidal collimator 16A.

Figure 7:
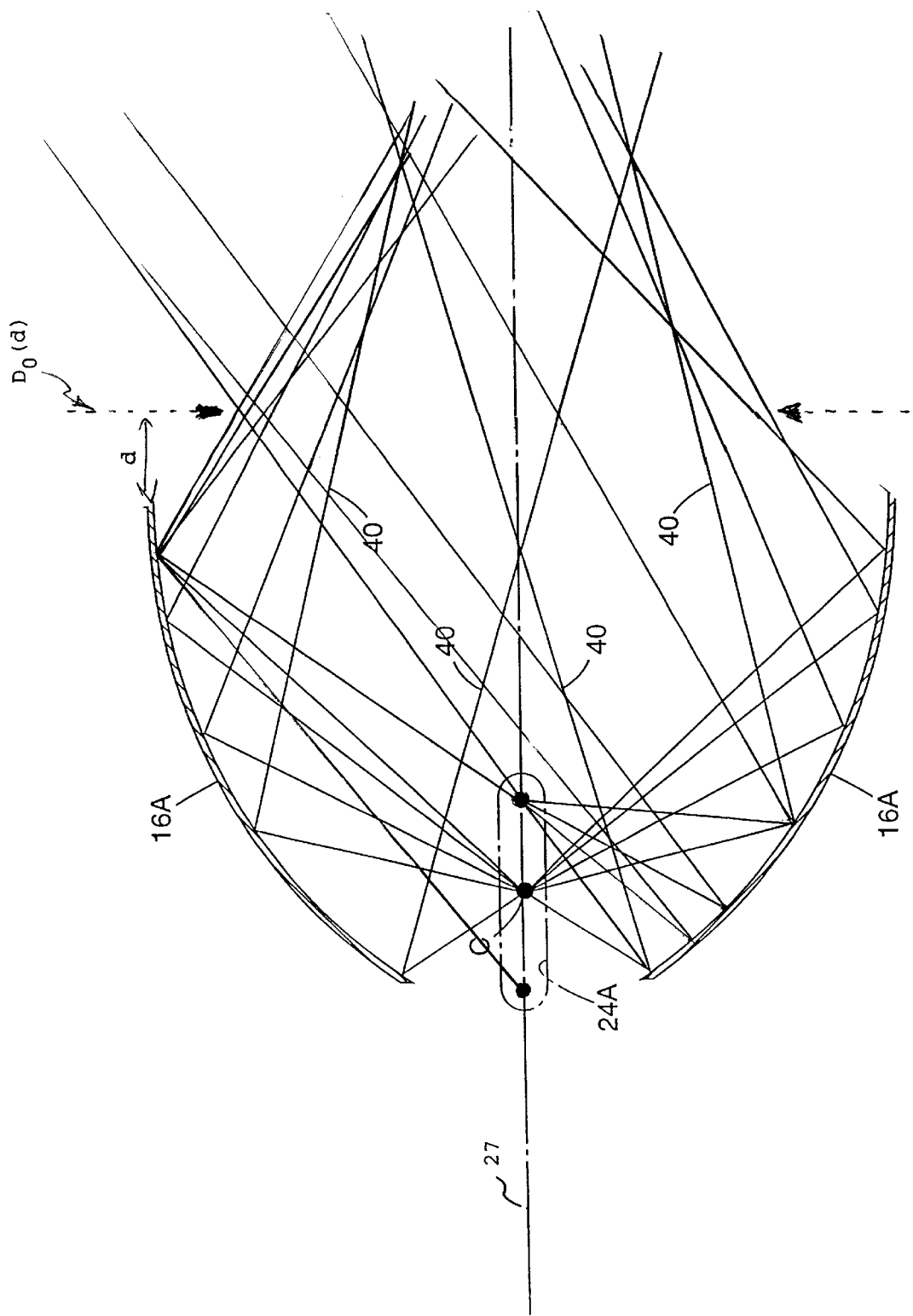
FIG. 7 is a schematic side elevation view showing how the paraboloidal collimator reflects light rays which pass through the centre, rearward (left) end, and forward (right) end of the light source.
Figure 8:
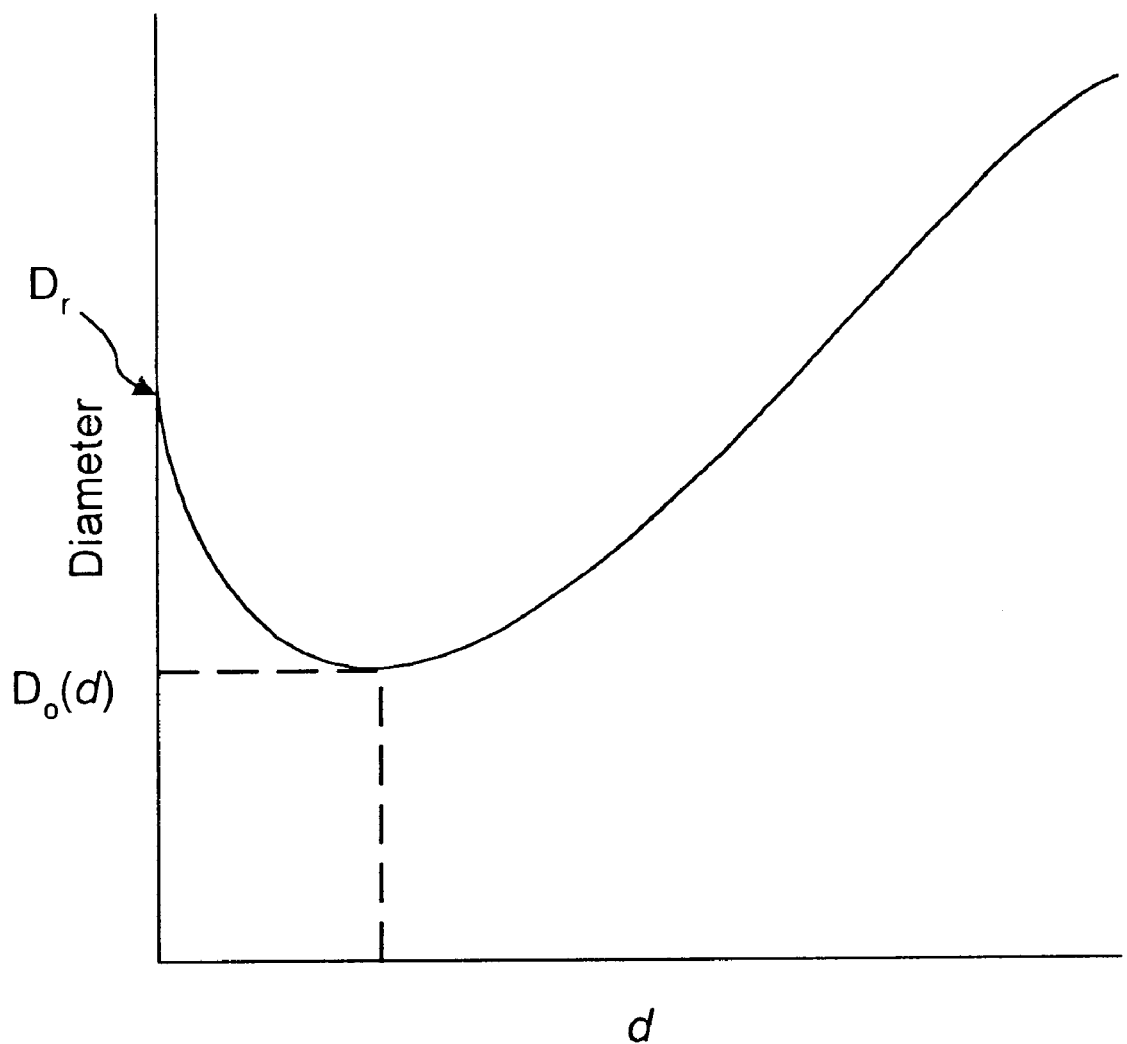
FIG. 8 graphically depicts the variation of the width of the output beam produced at the wide apertured end of the reflector as a function of distance d along the reflector's longitudinal axis.

Light bulb arc 24A is elongate and emits light rays along its entire length "L", not just from its center "C". As previously explained, this has an important bearing on the efficiency with which collimated light can be coupled into the light guide. FIG. 7, which is similar to FIG. 6 but omits reflectors 26, 28 and light guide 22A, shows not only light rays which originate at the center "C" of arc 24A, but also light rays which originate near the rearward (left) and forward (right) ends of arc 24A. As can be seen, the width of the light beam produced by reflector 16A varies as a function of distance d along axis 27. More particularly, and as is graphically depicted in FIG. 8, at the wide apertured end of reflector 16A the output beam's width is essentially equal to the diameter $D_r$ of the wide apertured end of reflector 16A. The beam width then decreases as d increases, eventually reaching a minimum value $D_o(d)$; and, thereafter, the beam width continues to increase as d increases. By structuring reflector 16A to produce a light beam having a minimum beam width equal to the diameter of the light guide's input end; and, by positioning the light guide's input end to coincide with the point at which the beam attains such minimum width, one may ensure that a maximal fraction of the light rays exiting reflector 16A are directed into the light guide's input end. Conversely, if the input end of the light guide were positioned to the left or to the right of the point at which beam attains its minimum width, then some light rays would be lost.

As previously explained, as a light guide's D:L ratio increases, it becomes progressively more difficult to achieve high efficiency coupling of collimated light from a light source into the light guide. For light guides having a given D:L ratio, the invention provides much higher efficiency in coupling of collimated light into such light guides than can be provided by prior art reflectors in respect of light guides having the same D:L ratio.

As will be apparent to those skilled in the art in the light of the foregoing disclosure, many alterations and modifications are possible in the practice of this invention without departing from the spirit or scope thereof. For example, although the invention has been described in relation to "prism" light guides, those skilled in the art will appreciate that the invention can be applied to any light guide having input collimation requirements and D:L ratio as described above. As another example, it is not necessary that the narrow apertured end 36 of output end annular reflector 28 coincide precisely with the input end of light guide 22A. In some cases, end 36 may project a short distance inside the input end of the light guide. This construction, which is convenient if the light guide happens to be out-of-round at its input end, is still considered to "circumferentially surround" the input end of the light guide, within the meaning of the claims. There should not however be a gap between the narrow apertured end 36 of output end reflector 28 and the input end of the light guide, because this would result in loss of light through the gap. Persons skilled in the art will also understand that the invention is not confined to the dimensional or geometrical relationships depicted in the drawings. The scope of the invention is to be construed in accordance with the substance defined by the following claims.

What is claimed is:

1. A reflector for reflecting light emitted by an elongate light source into an input end of a light guide having a light guide diameter "D", said reflector comprising:

(a) a collimating reflector having:
  (i) a narrow apertured end for insertable positioning of said light source within said collimating reflector;
  (ii) a wide apertured end for emitting light into said light guide, said wide apertured end of said collimating reflector having a diameter exceeding said light guide diameter "D";
(b) an output end annular reflector having:
  (i) a wide apertured end circumferentially surrounding said collimating reflector near said wide apertured end of said collimating reflector;
  (ii) a narrow apertured end circumferentially surrounding said input end of said light guide;
wherein:
  (1) said reflectors are cylindrically symmetrical about a common longitudinal axis;
  (2) light rays emitted by said light source which pass to said collimating reflector are reflected by said collimating reflector and produce an output light beam having a beam width which varies as a function of distance along said axis; and,
  (3) said light guide input end is positioned at a selected distance along said axis at which said output light beam has a minimum beam width value.

2. A reflector as defined in claim 1, wherein said collimating reflector is an off-axis paraboloidal cross-section, cylindrically symmetrical reflector.

3. A reflector as defined in claim 2, said input end annular reflector further comprising a curved surface, wherein in any cross-sectional plane containing said axis, said curved surface defines:
  (i) a first arc on one side of said axis, said first arc having a first centre of curvature located on said one side of said axis, and located within a cylinder which is symmetrical about said axis and which has a diameter not greater than the diameter of said narrow apertured end of said collimating reflector; and,
  (ii) a second arc on an opposed side of said axis, said second arc having a second centre of curvature located on said opposed side of said axis, and located within said cylinder.

4. A reflector as defined in claim 2, wherein said light source is a metal halide light bulb having an elongate light emitting arc.

5. A reflector as defined in claim 4, wherein said light emitting arc has one end near said focal point f and an opposed end near said narrow apertured end of said collimating reflector.

6. A reflector as defined in claim 1, wherein:
  (a) said collimating reflector has a focal point f; and,
  (b) said output end annular reflector further comprises a spherical arc section having a center of curvature near said focal point f.

* * * * *